(12) United States Patent
Takashita et al.

(10) Patent No.: US 10,566,820 B2
(45) Date of Patent: Feb. 18, 2020

(54) CONTROL SYSTEM, CONTROL DEVICE, SERVER, AND CONTROL METHOD

(71) Applicant: SHARP KABUSHIKI KAISHA, Sakai, Osaka (JP)

(72) Inventors: Koichi Takashita, Sakai (JP); Isao Kawachi, Sakai (JP); Yuhsuke Yamada, Sakai (JP); Ataru Okura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 73 days.

(21) Appl. No.: 15/574,113

(22) PCT Filed: Mar. 4, 2016

(86) PCT No.: PCT/JP2016/056792
§ 371 (c)(1),
(2) Date: Nov. 14, 2017

(87) PCT Pub. No.: WO2016/185760
PCT Pub. Date: Nov. 24, 2016

(65) Prior Publication Data
US 2018/0351385 A1    Dec. 6, 2018

(30) Foreign Application Priority Data

May 18, 2015  (JP) .................................. 2015-100907
May 18, 2015  (JP) .................................. 2015-100913

(51) Int. Cl.
*H02J 7/00*     (2006.01)
*H02J 7/34*     (2006.01)
(Continued)

(52) U.S. Cl.
CPC .............. *H02J 7/0088* (2013.01); *H02J 3/14* (2013.01); *H02J 7/00* (2013.01); *H02J 7/0068* (2013.01);
(Continued)

(58) Field of Classification Search
CPC ....................................................... H02J 7/34
(Continued)

(56) References Cited

U.S. PATENT DOCUMENTS

2004/0246145 A1*  12/2004  Andrews ................ G01Q 5/005
                                                340/971
2011/0202221 A1*   8/2011  Sobue .................... B60K 16/00
                                                701/22
(Continued)

FOREIGN PATENT DOCUMENTS

JP    2007-148477 A    6/2007
JP    2011-160500 A    8/2011
(Continued)

*Primary Examiner* — David V Henze-Gongola
(74) *Attorney, Agent, or Firm* — ScienBiziP, P.C.

(57) ABSTRACT

A control system including a control device, which is connected to a power storage device capable of supplying power to one or more electric apparatuses, and a server, by which reduction in a communication load and appropriate charge/discharge control are both achieved, is provided. When acquiring weather information from a server, a control device, on the basis of the weather information, charge to the power storage device and power supply from the power storage device to the electric apparatus. The control device decides a period from timing at which the weather information is acquired to timing at which weather information is next acquired. At second timing at which the period has elapsed from first timing at which the weather information has been acquired, the control device repeats an operation from acquisition of weather information to decision of a
(Continued)

period after which weather information is next acquired from the server.

4 Claims, 17 Drawing Sheets

(51) Int. Cl.
*H02J 13/00* (2006.01)
*H02J 3/14* (2006.01)

(52) U.S. Cl.
CPC .......... *H02J 7/34* (2013.01); *H02J 13/0075* (2013.01); *H02J 2003/143* (2013.01); *Y02E 70/40* (2013.01)

(58) Field of Classification Search
USPC ........................................... 320/128
See application file for complete search history.

(56) References Cited

U.S. PATENT DOCUMENTS

2012/0293021 A1* 11/2012 Teggatz .................. H02M 1/32
307/151
2013/0162037 A1* 6/2013 Kim ...................... H02J 7/0068
307/24
2015/0015075 A1 1/2015 Toya et al.

FOREIGN PATENT DOCUMENTS

| JP | 2012-235541 A | 11/2012 |
| JP | 2013-27136 A | 2/2013 |
| WO | 2014/068874 A1 | 5/2014 |

* cited by examiner

FIG.4

| LEVEL | WEATHER INFORMATION |
|---|---|
| A | HEAVY RAIN EMERGENCY WARNING |
| A | HEAVY RAIN WARNING |
| A | STORM EMERGENCY WARNING |
| A | STORM WARNING |
| A | HIGH WAVES EMERGENCY WARNING |
| B | HEAVY RAIN ADVISORY |
| B | GALE ADVISORY |
| B | HIGH WAVES WARNING |
| B | HIGH WAVES ADVISORY |
| ⋮ | ⋮ |

(A)

| LEVEL | ACQUISITION INTERVAL |
|---|---|
| A | 15 MINUTES |
| B | 30 MINUTES |
| C | 60 MINUTES |
| ⋮ | ⋮ |

| TYPE OF WEATHER INFORMATION | | TYPE OF CHARGE/DISCHARGE CONTROL |
|---|---|---|
| HEAVY RAIN | EMERGENCY WARNING | CONTROL CORRESPONDING TO WEATHER INFORMATION |
| | WARNING | CONTROL CORRESPONDING TO WEATHER INFORMATION |
| | ADVISORY | CONTROL OF SUPPLYING POWER |
| STORM (GALE) | EMERGENCY WARNING | CONTROL CORRESPONDING TO WEATHER INFORMATION |
| | WARNING | CONTROL CORRESPONDING TO WEATHER INFORMATION |
| | ADVISORY | CONTROL OF SUPPLYING POWER |
| HIGH WAVES | EMERGENCY WARNING | CONTROL CORRESPONDING TO WEATHER INFORMATION |
| | WARNING | CONTROL OF SUPPLYING POWER |
| | ADVISORY | CONTROL OF SUPPLYING POWER |

CHARGE/DISCHARGE CONTROL SETTING

AREA SETTING

ZIP CODE :

[　　　　] [CHECK]

AREA :XXXXX

☐ ENABLE WEATHER INFORMATION COOPERATION

○ ALL EMERGENCY WARNINGS

○ ALL EMERGENCY WARNINGS + WARNINGS

SELECT TARGET WARNING

☐ STORM ☐ SNOWSTORM
☐ HEAVY RAIN ☐ FLOOD
☐ STORM SURGE ☐ HEAVY SNOW
☐ HIGH WAVES

[CANCEL] [SET]

CONTROL SYSTEM, CONTROL DEVICE, SERVER, AND CONTROL METHOD

TECHNICAL FIELD

The disclosure relates to a control system, a control device, a server, and a control method, and, particularly, relates to a control system, a control device, a server, and a control method by which power management of an electric apparatus in home or the like is performed on the basis of weather information.

BACKGROUND ART

A power system in which various electric apparatuses such as an air conditioner, lighting, and a water heater, which are arranged in home or an office, and a power storage device are connected has been known. In the power system, control is performed so that power is stored in the power storage device, for example, in a time period during which a demand for power is little or in a time period during which power rates are low and the power of the power storage device is supplied (discharged) to the electric apparatuses, for example, in a time period during which the demand for power is increasing or in a time period during which the power rates are high. Thereby, equalization of the demand for power and suppression of the power rates are achieved.

Such a power system provides power stored in the power storage device to each of the electric apparatuses when a power failure is caused, and thereby enables the electric apparatuses to operate even in the case of the power failure. Thus, in a case where there is a possibility that a power failure is caused, it is desired that a power storage amount is increased in advance. On the other hand, when control by which discharge is suppressed to increase the power storage amount is continued for a long time more than necessary, equalization of the demand for power or suppression of the power rates are not achieved appropriately in some cases.

For example, in Japanese Unexamined Patent Application Publication No. 2007-148477 (PTL 1), a monitoring system in which disaster information is managed by a server on a wide area network and a processing device for monitoring collects the disaster information at predetermined intervals is disclosed.

Moreover, for example, in Japanese Unexamined Patent Application Publication No. 2012-235541 (PTL 2), a control device which is a device controlling charge/discharge of a storage battery and acquires information indicating a sign of a power failure from a server and performs charge/discharge control in accordance with a degree of urgency of necessity for charge, which is calculated on the basis of the information, is disclosed.

CITATION LIST

Patent Literature

PTL 1: Japanese Unexamined Patent Application Publication No. 2007-148477
PTL 2: Japanese Unexamined Patent Application Publication No. 2012-235541

SUMMARY OF INVENTION

Technical Problem

In an aspect, in a case where, as the system disclosed in Japanese Unexamined Patent Application Publication No. 2007-148477, charge/discharge control of a power storage device is performed by acquiring weather information from a server that provides the weather information, communication between a control device and the server is established in each environment, such as a home, in which the power storage device is installed. Accordingly, in a case where each interval at which the control device acquires weather information from the server is short, a communication load increases in an entire network. On the other hand, when each interval at which the control device acquires weather information from the server is made long, while it is possible to suppress the communication load, careful charge/discharge control according to the weather information is not realized in some cases.

In another aspect, the control device disclosed in Japanese Unexamined Patent Application Publication No. 2012-235541 has a problem that, in a case where communication with the server is interrupted and the information indicating a sigh of a power failure is not able to be acquired, it is difficult to perform charge/discharge control according to the degree of urgency. For example, when there is a sign of a power failure, the control device performs control to increase a power storage amount in the storage battery. In a case where communication between the control device and the server is thereafter interrupted, the control device does not perform discharge control, so that a state in which the power storage amount is large is maintained. Thus, it is difficult to appropriately achieve equalization of the demand for power or suppression of the power rates after a power failure is restored.

An object of an aspect of the present disclosure is to provide a control system, a control device, a server, and a control method by which reduction in a communication load and appropriate charge/discharge control are both achieved.

An object of another aspect of the present disclosure is to provide a control device, a control system, and a control method by which standardization of charge/discharge control is achieved regardless of a condition of communication with an outside such as a server that provides weather information.

Solution to Problem

According to an embodiment, a control system includes: a control device that is connected to a power storage device capable of supplying power to one or more electric apparatuses; and a server that is capable of communication with the control device. The server includes a transmission portion that transmits weather information to the control device. The control device includes a charge/discharge control portion that controls, on the basis of the weather information transmitted from the server, charge to the power storage device and power supply from the power storage device to the electric apparatuses. The control system further includes a decision portion that decides, on the basis of the weather information to be transmitted by the server, a period from timing at which the weather information is transmitted to timing at which the server next transmits weather information to the control device, and a communication control portion that controls communication between the server and the control device so that, at second timing at which the period has elapsed from first timing at which the server has transmitted the weather information to the control device, the server further transmits weather information to the control device.

According to another embodiment, a control device is connected to a power storage device capable of supplying power to one or more electric apparatuses. The control device includes: a communication control portion that controls communication with a server; an acquisition portion that acquires weather information from the server; a charge/discharge control portion that controls, on the basis of the weather information acquired from the server, charge to the power storage device and power supply from the power storage device to the electric apparatuses; and a decision portion that decides, on the basis of the weather information acquired from the server, a period from timing at which the weather information is acquired to timing at which the acquisition portion next acquires weather information. In a case where the weather information is acquired from the server, the communication control portion controls communication with the server to further acquire, after the period has elapsed from timing at which the weather information has been acquired, weather information from the server.

According to still another embodiment, a server is capable of communication with a control device connected to a power storage device capable of supplying power to one or more electric apparatuses. The server includes: a transmission portion that transmits weather information to the control device; a decision portion that decides, on the basis of the weather information to be transmitted to the control device, a period from timing at which the weather information is transmitted to timing at which the transmission portion next transmits weather information; and a communication control portion that controls communication with the control device to further transmit, at second timing at which the period has elapsed from first timing at which the weather information has been distributed, weather information.

According to yet another embodiment, a control method is a control method of a power storage device, which is performed by a control device that is connected to the power storage device capable of supplying power to one or more electric apparatuses. The control method includes the steps of: acquiring weather information from a server; controlling, on the basis of the weather information acquired from the server, charge to the power storage device and power supply from the power storage device to the electric apparatuses; deciding, on the basis of the weather information acquired from the server, a period from timing at which the weather information is acquired to timing at which weather information is next acquired; and repeating, at second timing at which the period has elapsed from first timing at which the weather information has been acquired, an operation from the step of acquiring to the step of deciding.

According to further embodiment, a control device is connected to a power storage device capable of supplying power to one or more electric apparatuses. The control device includes a mode corresponding to weather information, in which charge/discharge control of a storage battery is performed in accordance with weather information acquired from an outside, as a charge/discharge control mode of the storage battery. In a case where weather information is not acquired from the outside for a prescribed period after control is started in the mode corresponding to weather information in accordance with the acquired weather information, the control device switches from the control in the mode corresponding to weather information to control in a different mode.

According to still further embodiment, a control system includes: a power storage device that is capable of supplying power to one or more electric apparatuses; and a control device that is connected to the power storage device. The control device includes, as a charge/discharge control mode of a storage battery, a mode corresponding to weather information in which charge/discharge control of the storage battery is performed in accordance with weather information acquired from an outside. In a case where weather information is not acquired from the outside for a prescribed period after control is started in the mode corresponding to weather information in accordance with the acquired weather information, the control device switches from the control in the mode corresponding to weather information to control in a different mode.

According to yet further embodiment, a control method is a control method of a control device that is connected to a power storage device capable of supplying power to one or more electric apparatuses. The control device includes, as a charge/discharge control mode of a storage battery, a mode corresponding to weather information in which charge/discharge control of the storage battery is performed in accordance with weather information acquired from an outside. The control method includes switching from control in the mode corresponding to weather information to control in a different mode in a case where weather information is not able to be acquired from the outside for a prescribed period after the control is started in the mode corresponding to weather information in accordance with the acquired weather information.

Advantageous Effects of Invention

According to the disclosure, in a control system that includes a control device connected to a power storage device capable of supplying power to one or more electric apparatuses and a server capable of communication with the control device, reduction in a communication load and appropriate charge/discharge control are both achieved.

According to the disclosure, standardization of charge/discharge control of a power storage device is achieved regardless of a condition of communication between a control device and an outside such as a server that provides weather information.

BRIEF DESCRIPTION OF DRAWINGS

FIG. 4(A) is a view indicating an example of a level for each type of weather information, and (B) is a view indicating an interval until the next acquisition of weather information for each level.

FIG. 13 is a view indicating an example of a relation of charge/discharge control to be executed for each type of weather information.

FIG. 16 is a view indicating an example of a setting screen displayed on a terminal device according to the fourth embodiment.

DESCRIPTION OF EMBODIMENTS

Hereinafter, embodiments of the invention will be described with reference to drawings. In the description below, the same reference signs are assigned to the same parts and constituents. The same apples also to names and functions thereof. Thus, description thereof is not iterated.

First Embodiment

<System Configuration>

Figure 1:
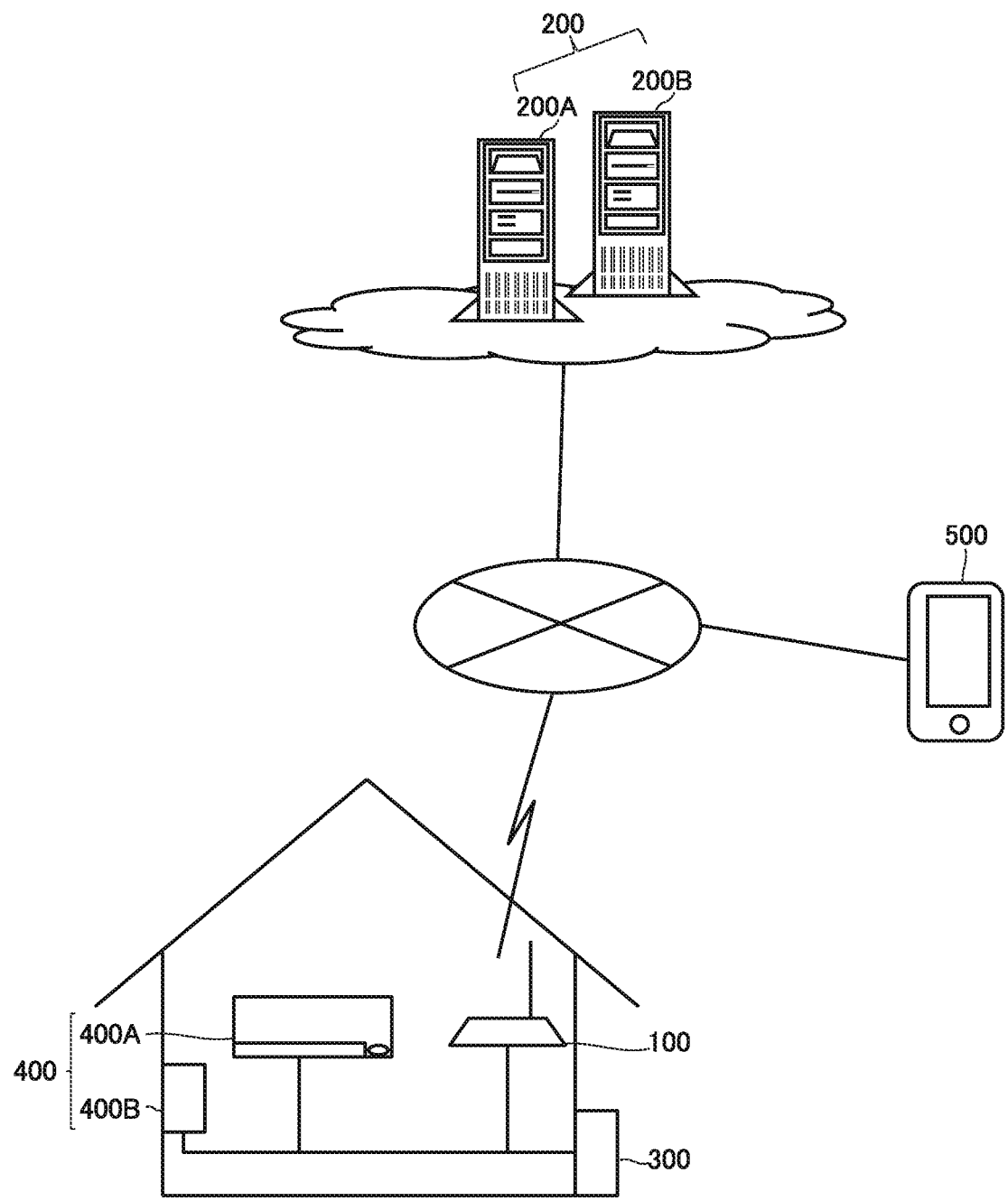
FIG. 1 is a view illustrating a specific example of a configuration of a control system according to an embodiment.

FIG. 1 is a view illustrating a specific example of a configuration of a control system according to the present embodiment. Referring to FIG. 1, the control system includes control device 100 that is connected to a power storage device 300 including a storage battery (not illustrated), which is capable of supplying power to electric apparatuses such as an air conditioner 400A and a water heater 400B in home or in an office, and a server 200 as an example of an external device which is capable of communication with the control device 100 via the Internet or the like. One or more electric apparatuses such as the air conditioner 400A and the water heater 400B are also referred to as electric apparatuses 400 representatively.

The control device 100 is also referred to as a HEMS controller. The HEMS controller is a controller used for a home energy management system (HEMS) that performs visualization of a used amount of power, apparatus control for power saving (reduction in an emitted amount of carbon dioxide), control of renewable energy of a solar power generator or the like or a condenser, for example.

The server 200 may be composed of a plurality of servers, such as a server 200A for managing a power condition of each home and a server 200B for providing weather information, which take partial charge of processing described below and cooperate, or may be a single server. The server 200 may be composed of a general computer. The server 200 is able to be accessed from a terminal device 500 such as a smartphone or a tablet via the Internet or the like.

The control device 100 is connected to the power storage device 300 so as to be capable of communication therewith.

The control device 100 outputs a control signal to the power storage device 300. Thereby, the control device 100 controls charge to the power storage device 300 and power supply (discharge) to the electric apparatuses 400. Control of the charge to the power storage device 300 and the power supply (discharge) to the electric apparatuses 400, which is performed by the control device 100, is also referred to as charge/discharge control. Furthermore, the control device 100 makes an inquiry to the power storage device 300 to thereby acquire a power storage amount of the power storage device 300 from the power storage device 300.

The control device 100 is further connected to each of the one or more electric apparatuses 400 so as to be capable of communication therewith. The control device 100 receives a signal indicating a used amount of electricity from each of the one or more electric apparatuses 400 to thereby acquire the used amount of electricity in each of the electric apparatuses 400. Moreover, the control device 100 outputs a control signal to each of the electric apparatuses 400. The control signal is used for instructing an operating amount of the electric apparatus 400. For example, the control signal is used for instructing the electric apparatus 400 about temperature setting, an airflow volume setting, or the like. Thereby, the control device 100 controls operations of the electric apparatuses 400.

The control device 100 is connected to the server 200 via the Internet or the like so as to be capable of communication therewith. The control device 100 transmits the used amount of electricity of each of the one or more electric apparatuses 400 to the server 200. Moreover, the control device 100 transmits the power storage amount of the power storage device 300 to the server 200. The server 200 receives the used amounts of electricity of the electric apparatuses 400 and the power storage amount of the power storage device 300 from the control device 100, and manages a power condition of each home. In addition, the control device 100 makes an inquiry to the server 200 to acquire weather information from the server 200 as the example of the external device.

The server 200 receives access from the terminal device 500 via the Internet or the like. The server 200 receives access, for example, only from the terminal device 500 that has successfully logged in. The server 200 provides screen information, by which a power condition of a home stored in association with a user of the terminal device 500 is displayed, to the terminal device 500 in response to a request from the terminal device 500. Moreover, the server 200 provides screen information, by which a screen with which setting for the electric apparatus 400 or the power storage device 300 of the home stored in association with the user of the terminal device 500 is received is displayed, to the terminal device 500 in response to a request from the terminal device 500. When receiving various types of setting input to the screen from the terminal device 500, the server 200 outputs information based on the setting to the control device 100. The control device 100 may perform control of the electric apparatus 400 or the power storage device 300 on the basis of the information from the server 200.

<Device Configurations>

Figure 2:
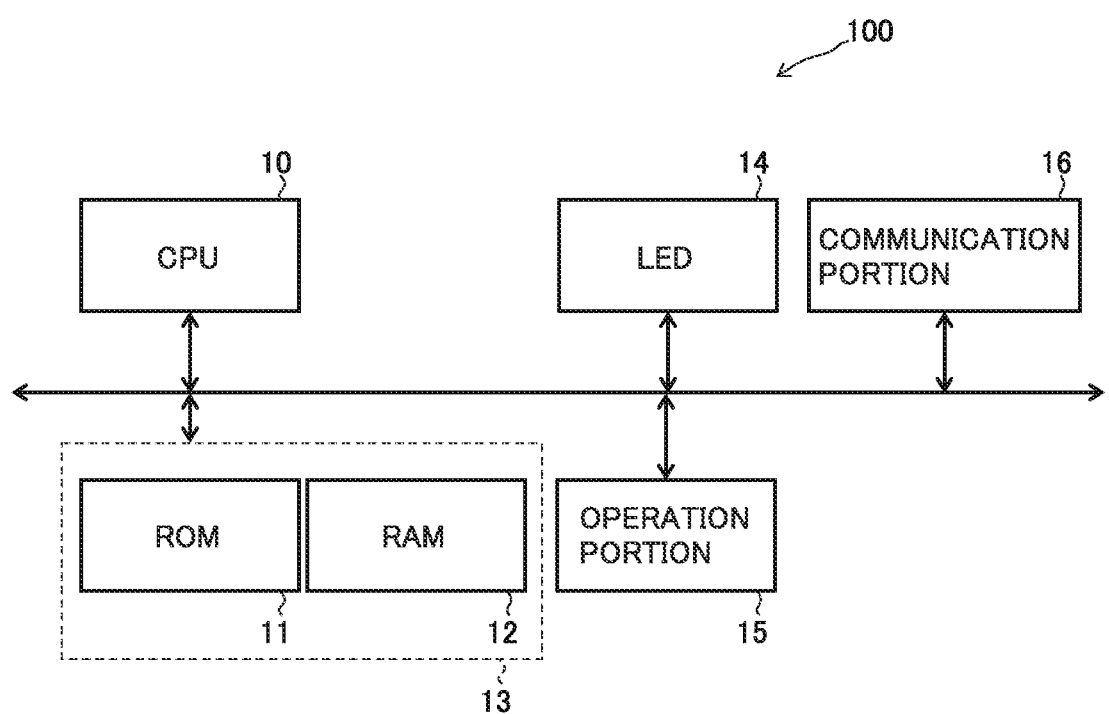
FIG. 2 is a block diagram illustrating an example of a schematic device configuration of a control device included in the control system.

FIG. 2 is a block diagram illustrating an example of a schematic device configuration of the control device 100. Referring to FIG. 2, the control device 100 includes a CPU (Central Processing Unit) 10, which controls the entire device, and a memory 13. The memory 13 includes, as examples, a ROM (Read Only Memory) 11 that stores a program to be executed by the CPU 10 and a RAM (Random Access Memory) 12 that, for example, stores various types of data such as state information of the electric apparatus and serves as a workspace when the CPU 10 executes the program.

The control device 100 may include an LED (Light Emitting Diode) 14 as an output portion or an operation portion 15 such as a switch.

Furthermore, the control device 100 includes a communication portion 16 that performs communication with the electric apparatus 400 and the server 200.

Figure 3:
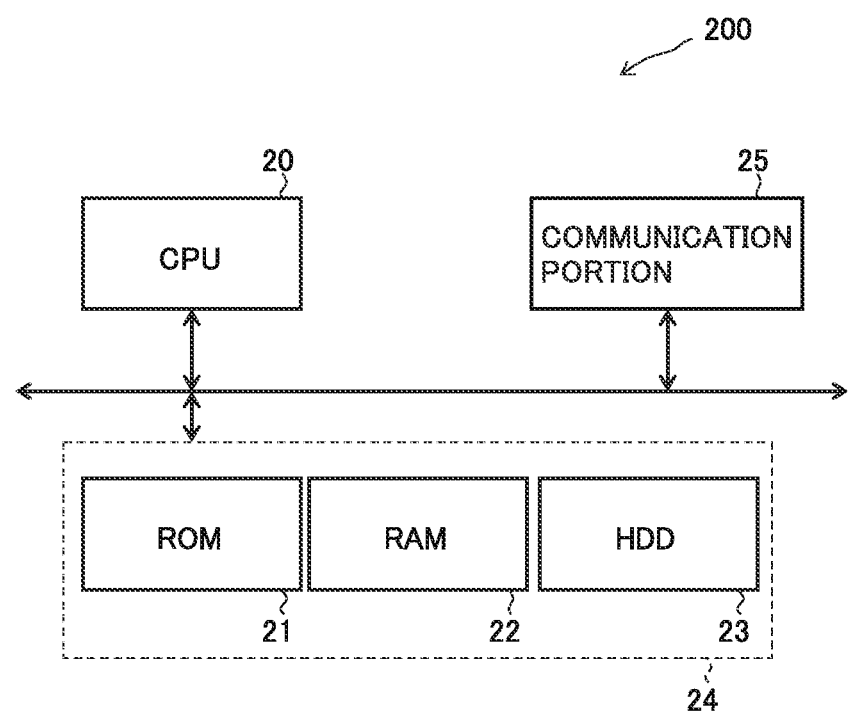
FIG. 3 is a block diagram illustrating an example of a schematic device configuration of a server included in the control system.

FIG. 3 is a block diagram illustrating an example of a schematic device configuration of the server 200. The server 200 may be composed of a general computer. Thus, FIG. 3 illustrates a schematic configuration of a general computer.

Referring to FIG. 3, the server 200 includes a CPU 20 that controls the entire device, a memory 24, and a communication portion 25 that performs communication via the Internet. The memory 24 includes, as examples, a ROM 21 that stores a program to be executed by the CPU 20, a RAM 22 that, for example, serves as a workspace when the CPU 20 executes the program and stores a calculation value, and an HDD (Hard Disk Drive) 23 that stores various types of information.

The configuration of the server 200 is not limited to the configuration in FIG. 3. For example, the server 200 may further include an operation portion that receives an operation input of a user or a display. Moreover, in a case where the server 200 is composed of a plurality of devices as exemplified in FIG. 1, each of the servers may further include a communication device that performs communication with the other device.

<Overview of Operation>

The control system according to the present embodiment executes charge/discharge control of the power storage device 300 on the basis of weather information transmitted from the server 200. The weather information is, for example, weather information announced by the Meteorological Agency, and types such as an emergency warning, a warning, and an advisory are set for each of categories such as a heavy rain and a storm. The server 200 includes a server that provides the weather information announced by the Meteorological Agency or includes a server that is capable of acquiring the weather information from the server.

The control device 100 included in the control system executes normal charge/discharge control in a period during which weather information of a prescribed type is not announced. The normal charge/discharge control means controlling the power storage device 300 to charge in a time period, such as nighttime, during which power rates are low, and to supply (discharge) power to the electric apparatus 400 in a time period, such as daytime, during which the power rates are high. Moreover, the normal charge/discharge control means controlling the power storage device 300 to charge in a time period, such as nighttime, during which a demand for power from the electric apparatus 400 is little, and to supply (discharge) power to the electric apparatus 400 in a time period, such as daytime, during which the demand for power from the electric apparatus 400 is increasing.

When acquiring the weather information of the prescribed type from the server 200 in a period during which the normal charge/discharge control is performed and the power storage device 300 is controlled to supply (discharge) power to the electric apparatus 400, the control device 100 performs switching to control corresponding to weather information. The control corresponding to weather information means control of starting charge so as to bring the storage battery in a fully charged state and, after bringing the storage battery in the fully charged state, maintaining the state. In a case where a power failure is caused during the control corresponding to weather information, discharge is started. Then, when the weather information is called off, the control device 100 finishes the control corresponding to weather information and performs switching to the normal charge/discharge control, that is, the control to supply (discharge) power to the electric apparatus 400.

In order to realize the charge/discharge control, the control device 100 acquires weather information from the server 200 at prescribed timing. The acquisition of weather information by the control device 100 may be realized when the control device 100 requests the weather information from the server 200 and the weather information is transmitted to the control device 100 from the server 200 responding to the request. Alternatively, the server 200 may spontaneously transmit the weather information to the control device 100. In the present embodiment, transmission of the weather information is performed by the former method, but may be performed by the latter method.

In order to realize the charge/discharge control corresponding to weather information, it is desired that the control device 100 acquires weather information from the server 200 at short intervals. However, when the control device 100 attempts to acquire weather information from the server 200 at short intervals, a communication amount between the server 200 and the control device 100 increases. This causes an increase in a communication load of the server 200 particularly in a case where the server 200 is connected to a plurality of control devices.

Then, in the system according to the present embodiment, a level is set correspondingly to each type of weather information in advance, and a communication interval between the control device 100 and the server 200 is controlled so that next weather information is acquired from the server 200 at timing corresponding to a level of acquired weather information.

As an example, in the first embodiment, the control device 100 controls, correspondingly to the level of weather information, timing of requesting next weather information from the server 200. In order to realize the control, the control device 100 stores, in the memory 13, a level for each type of weather information and an interval until the next acquisition of weather information for each level in advance. FIG. 4(A) is a view indicating an example of the level for each type of weather information. FIG. 4(B) is a view indicating the interval for each level until the next acquisition of weather information.

Referring to FIG. 4(A), the control device 100 stores, for example, a level A for a heavy ran emergency warning, a heavy rain warning, a storm emergency warning, a storm warning, and a high waves emergency warning, and a level B for a heavy rain advisory, a gale advisory, a high waves warning, and a high waves advisory. Referring to FIG. 4(B), the control device 100 stores, for example, 15 minutes for the level A, 30 minutes for the level B, and 60 minutes for a level C as an interval until the next acquisition of weather information.

The levels for the respective types of weather information, which are indicated in FIG. 4(A), and the periods for the respective levels until weather information is acquired next, which are indicated in FIG. 4(B), may be registered in the control device 100 in advance, may be set by the control device 100 in accordance with a control signal from the terminal device 500 or the like, or may be acquired from the server 200 or the like by the control device 100.

When requesting the server 200 and then acquiring weather information (first weather information), the control device 100 determines a level of a type of the weather information by referring to the relation in FIG. 4(A), and reads a time interval (period) corresponding to the determined level from the relation in FIG. 4(B). Then, when the read period has elapsed after acquiring the first weather information, the control device 100 requests next (second) weather information from the server 200. Thereby, in a case where, after the control corresponding to weather information has been started, the corresponding warning of the type of weather information or the like is called off, the control device 100 is able to promptly finish the control corresponding to weather information and perform switching to the normal charge/discharge control, that is, the control to supply (discharge) power to the electric apparatus 400.

Note that, in the example, a level is determined on the basis of a type of weather information, and a period associated with the determined level is read. As another example, the control device 100 may store a period for each type of weather information in advance and read a period corresponding to weather information acquired from the server 200.

Figure 5:
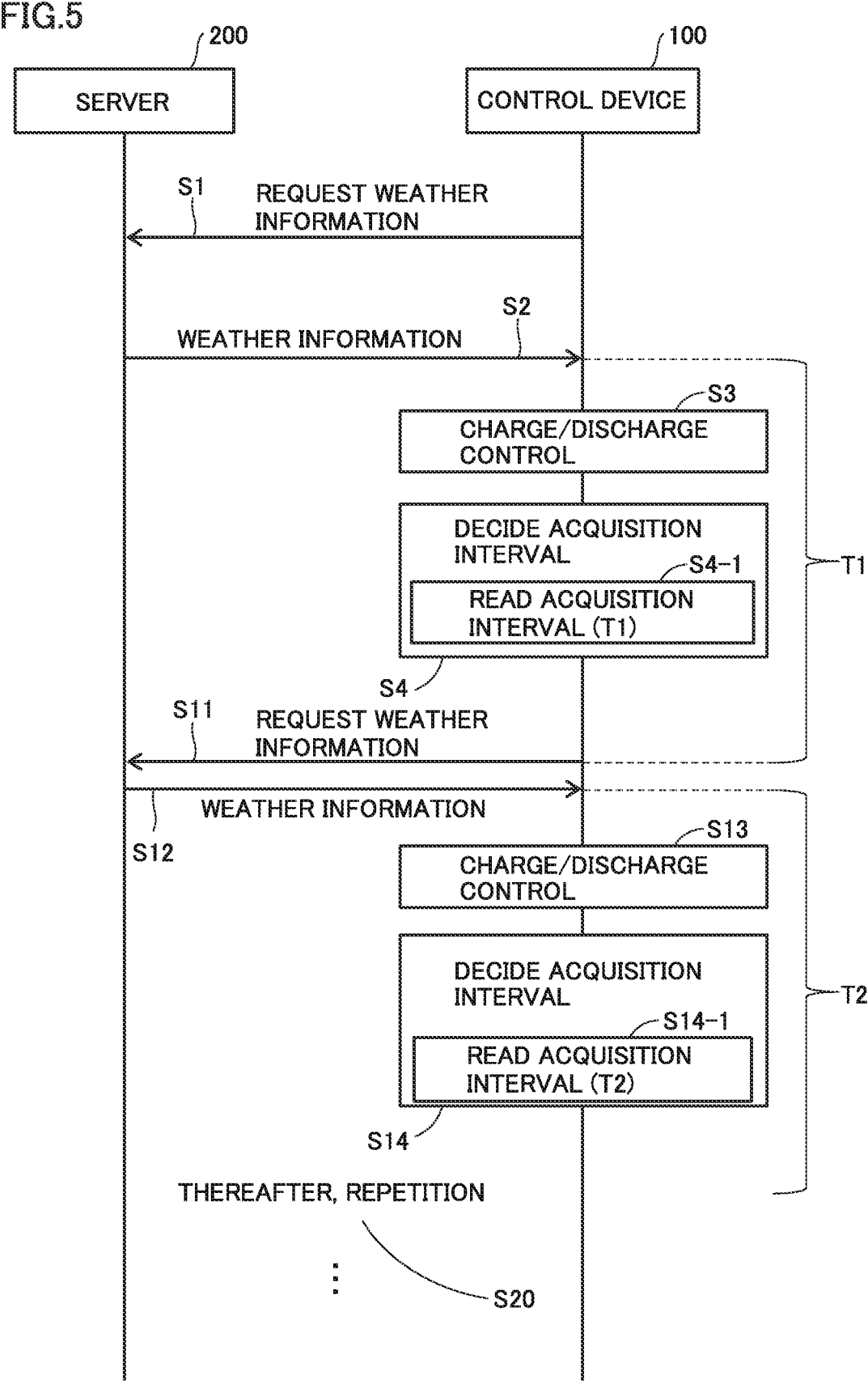
FIG. 5 is a view illustrating a flow of an operation of the control system according to a first embodiment.

FIG. 5 is a view illustrating a flow of an operation of the control system. Referring to FIG. 5, the control device 100 requests weather information from the server 200 at certain timing (step S1), and acquires the weather information from the server 200 (step S2). The control device 100 executes charge/discharge control on the basis of the acquired weather information (step S3).

Furthermore, on the basis of the acquired weather information, the control device 100 decides an interval until the next acquisition of weather information from the server 200 (step S4). Specifically, the control device 100 determines a level of the acquired weather information by referring to the relation of FIG. 4(A) and reads a time interval (period) T1 corresponding to the determined level from the relation of FIG. 4(B) (step S4-1).

When the weather information is acquired from the server 200 at step S2 above, the control device 100 starts timing, and when the period T1 which is read at step S4 above has elapsed, the control device 100 requests next weather information from the server 200 (step S11), and acquires the next weather information from the server 200 (step S12). The control device 100 executes charge/discharge control on the basis of the acquired weather information (step S13).

Furthermore, on the basis of the acquired weather information, the control device 100 decides an interval until the next acquisition of weather information from the server 200 (step S14). Specifically, the control device 100 determines a level of the acquired weather information by referring to the relation of FIG. 4(A) and reads a time interval (period) T2 corresponding to the determined level from the relation of FIG. 4(B) (step S14-1).

Thereafter, a similar operation is repeated in the system (step S20). That is, every time weather information is acquired from the server 200, the control device 100 determines a level of the acquired weather information by referring to the relation of FIG. 4(A) and reads a time interval (period) corresponding to the determined level from the relation of FIG. 4(B) to thereby decide timing at which weather information is next acquired.

It is preferable that, as weather information indicates a higher possibility of a power failure, a period until weather information is acquired next is set to be shorter, and, as weather information indicates a lower possibility of a power failure, a period until weather information is acquired next is set to be longer, as indicated in FIG. 4(A) and FIG. 4(B). By setting such a period, in the system, the control device 100 is able to acquire weather information, which is transmitted from the server 200, at a short time interval in a weather condition where there is a high possibility of a power failure, and to perform charge/discharge control corresponding to the weather information. On the other hand, in a weather condition where there is a low possibility of a power failure, it is possible to suppress communication between the control device 100 and the server 200.

<Function Configuration>

Figure 6:
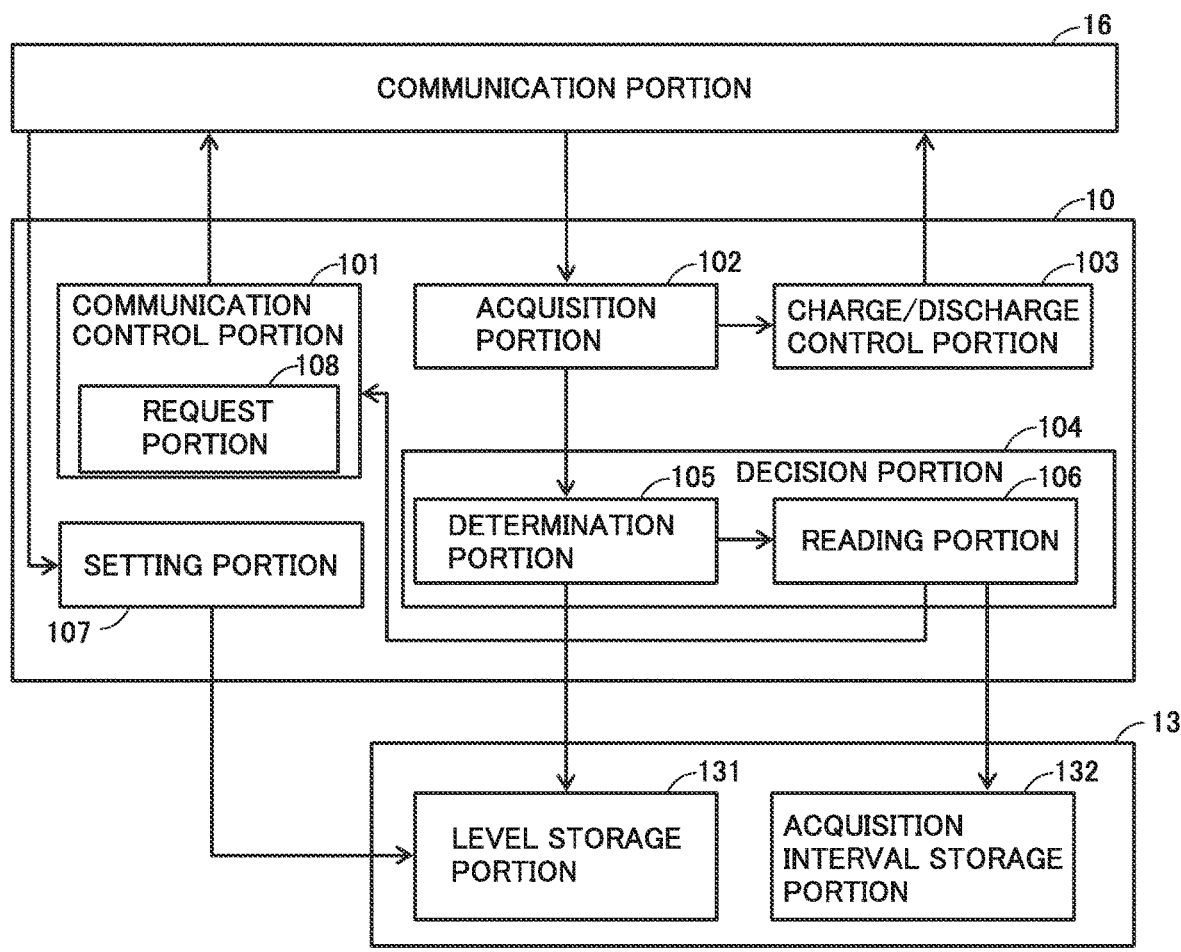
FIG. 6 is a block diagram illustrating an example of a function configuration of the control device according to the first embodiment.

FIG. 6 is a block diagram illustrating an example of a function configuration of the control device 100, by which the aforementioned operation is performed. Each of functions in FIG. 6 is realized mainly by the CPU 10 when the CPU 10 of the control device 100 reads and executes a program, stored in the ROM 11, on the RAM 12. However, at least a part of the functions may be realized by another type of hardware illustrated in FIG. 2 or another type of hardware, such as an electric circuit, which is not illustrated.

Referring to FIG. 6, the CPU 10 of the control device 100 includes a communication control portion 101 that controls communication with the server 200, an acquisition portion 102 that acquires weather information, a charge/discharge control portion 103 that executes charge/discharge control, and a decision portion 104.

The acquisition portion 102 acquires weather information from the server 200 by performing communication with the server 200. The decision portion 104 decides a time interval (period) which is a period from timing at which the weather information is acquired to timing at which the acquisition portion 102 next acquires weather information, on the basis of the weather information acquired from the server 200. As an example, the decision portion 104 includes a determination portion 105 and reading portion 106.

The memory 13 includes a level storage portion 131 that stores the level for each type of weather information, which is indicated in FIG. 4(A), and an acquisition interval storage portion 132 that stores the interval (period) for each level until the next acquisition of weather information, which is indicated in FIG. 4(B).

The determination portion 105 determines, by referring to the level storage portion 131, a level of weather information which is acquired from the server 200 by the acquisition portion 102. The reading portion 106 reads, from the acquisition interval storage portion 132, a time interval (period) corresponding to the level determined by the determination portion 105.

The CPU 10 of the control device 100 may further include a setting portion 107. The setting portion 107 receives a user operation performed with the use of the terminal device 500 or the like, and sets a time interval (period) which is a period from acquisition of weather information by the acquisition portion 102 to timing at which the acquisition portion 102 next acquires weather information. Specifically, the setting portion 107 may register, in accordance with the user operation, a level for each type of weather information in the level storage portion 131 or an interval (period) until the next acquisition of weather information in the acquisition interval storage portion 132.

The communication control portion 101 starts timing, when the acquisition portion 102 acquires weather information. The communication control portion 101 includes a request portion 108 that controls the communication portion 16 to request weather information from the server 200 when a period decided by the decision portion 104 has elapsed.

<Operation Flow>

Figure 7:
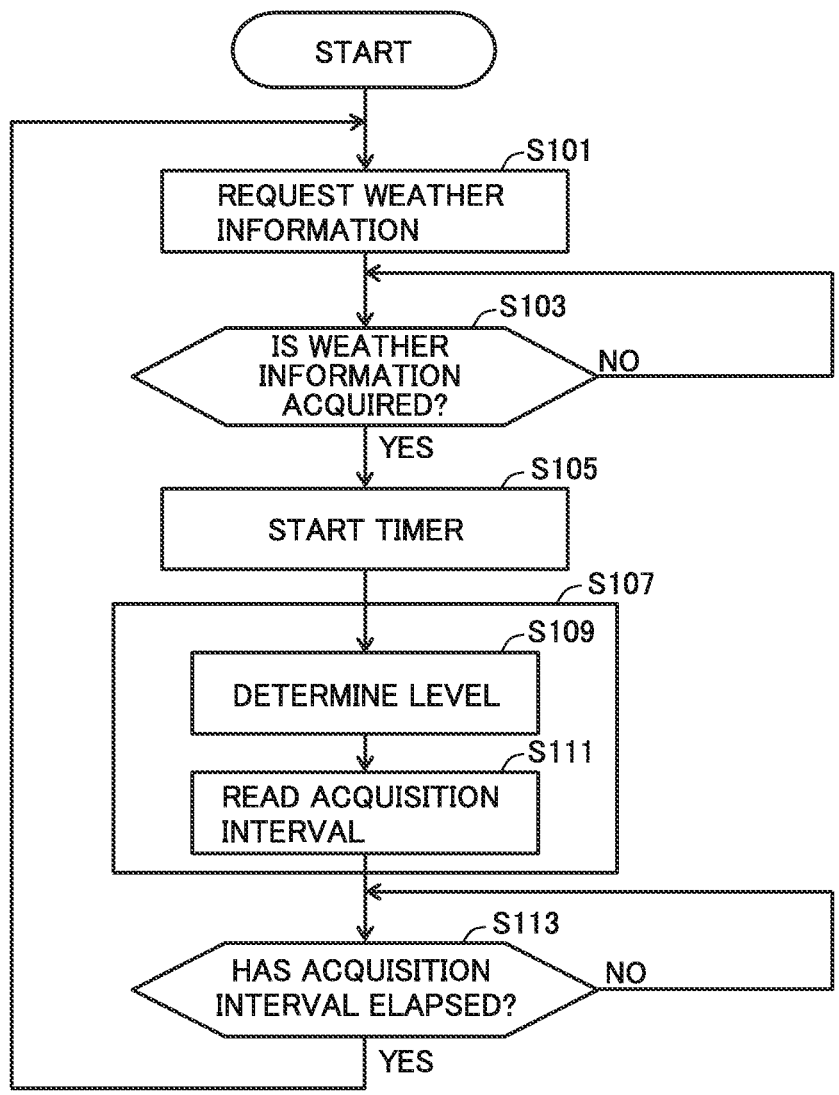
FIG. 7 is a flowchart illustrating a specific example of a flow of an operation of the control device according to the first embodiment.

FIG. 7 is a flowchart illustrating a specific example of a flow of an operation of the control device 100. The operation illustrated in the flowchart of FIG. 7 is realized when the CPU 10 of the control device 100 reads and executes a program, stored in the ROM 11, on the RAM 12 to exert each of the functions in FIG. 6. The operation in FIG. 7 is started at a time point when timing at which the control device 100 acquires weather information from the server 200 is reached.

Referring to FIG. 7, when timing at which weather information is acquired is reached, the CPU 10 requests the weather information from the server 200 (step S101). When acquiring the weather information from the server 200 (YES at step S103), the CPU 10 starts timing by starting a timer not illustrated (step S105).

On the basis of the weather information acquired from the server 200, the CPU 10 decides timing at which weather information is next acquired from the server 200 (step S107). Specifically, the CPU 10 determines a level of the acquired weather information by referring to the relation of FIG. 4(A) (step S109), and reads an interval (period), corresponding to the level, until the next acquisition of weather information from the relation of FIG. 4(B) (step S111).

The CPU 10 refers to the timer by which timing is started at step S105 above and monitors elapse of the period decided at step S107 above. Then, when the period has elapsed (YES at step S113), the CPU 10 repeats the operation from the beginning. That is, when the period has elapsed, the CPU 10 requests weather information from the server 200 (step S101).

Second Embodiment

In the system according to the first embodiment, an interval between transmissions of weather information from the server 200 to the control device 100 is decided on a side of the control device 100, and the control device 100 requests weather information from the server 200 in accordance with the decided interval. As another example, the interval between transmissions of weather information may be decided on a side of the server 200. In a system according to a second embodiment, the server 200 decides the interval (period) until the next transmission of weather information, on the basis of the weather information to be transmitted. Then, the server 200 delivers information indicating the period to the control device 100. Therefore, the server 200 according to the second embodiment or a storage device which is able to be accessed by the server 200 stores the relations of FIG. 4(A) and FIG. 4(B).

Since a configuration of the system and device configurations of the control device 100 and the server 200 according to the second embodiment are similar to the configuration of the system and the device configurations of the control device 100 and the server 200 according to the first embodiment, description thereof is not iterated.

Figure 8:
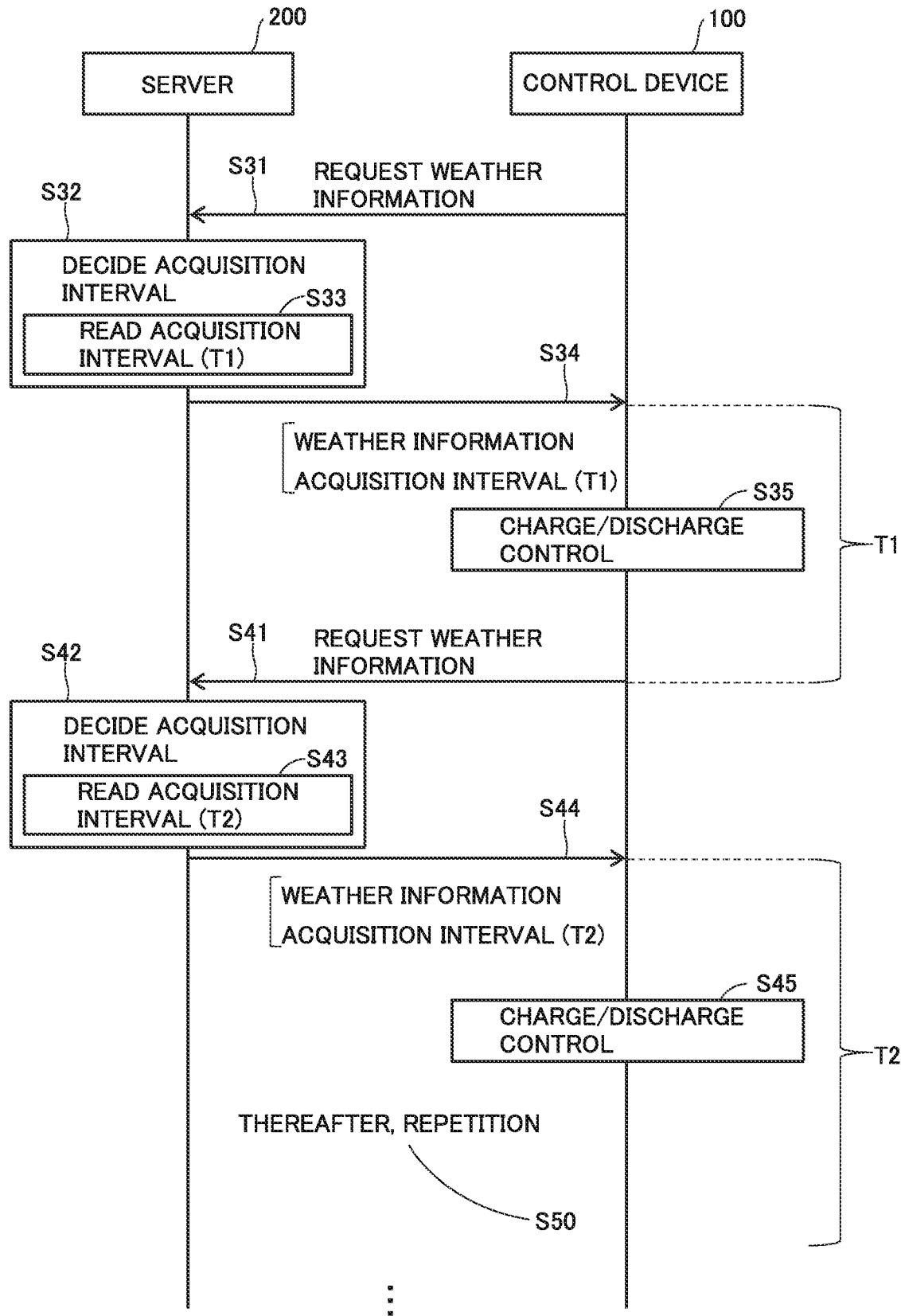
FIG. 8 is a view illustrating an operation of a control system according to a second embodiment.

FIG. 8 is a view illustrating an operation of the control system according to the second embodiment. Referring to FIG. 8, when receiving a request of weather information from the control device 100 (step S31), the server 200 decides an interval until the control device 100 next acquires weather information from the server 200, on the basis of the weather information to be transmitted to the control device 100 (step S32). Specifically, the server 200 determines a level of the weather information to be transmitted by referring to the relation of FIG. 4(A), and reads a time interval (period) T1 corresponding to the determined level from the relation of FIG. 4(B) (step S33).

The server 200 transmits, to the control device 100, information which is read with the weather information and indicates the time interval (period) T1 (step S34). Note that, the information indicating the period T1 may not be transmitted to the control device 100 with the weather information. The server 200 only needs to transmit the information indicating the period T1 to the control device 100 until the period T1 has elapsed after timing at which the weather information is transmitted.

The control device 100 executes charge/discharge control on the basis of the acquired weather information (step S35).

Furthermore, when acquiring the weather information from the server 200, the control device 100 starts timing, and monitors elapse of the period T1 indicated by the information acquired from the server 200. Then, when the period T1 has elapsed, the control device 100 requests weather information from the server 200 (step S41).

When receiving the request of the weather information from the control device 100, similarly to step S32 above, the server 200 reads, from the relation of FIG. 4(B), a time interval T2 corresponding to a level of the weather information to be transmitted (step S43) to thereby decide the time interval (period) T2 until the control device 100 next acquires weather information (step S42). Then, the server 200 transmits, to the control device 100, information which is decided with the weather information and indicates the time interval (period) T2 (step S44). The control device 100 executes charge/discharge control on the basis of the acquired weather information (step S45).

Thereafter, a similar operation is repeated in the system (step S50). That is, every time the control device 100 requests weather information from the server 200, timing at which the control device 100 next acquires weather information is decided in the server 200.

Figure 9:
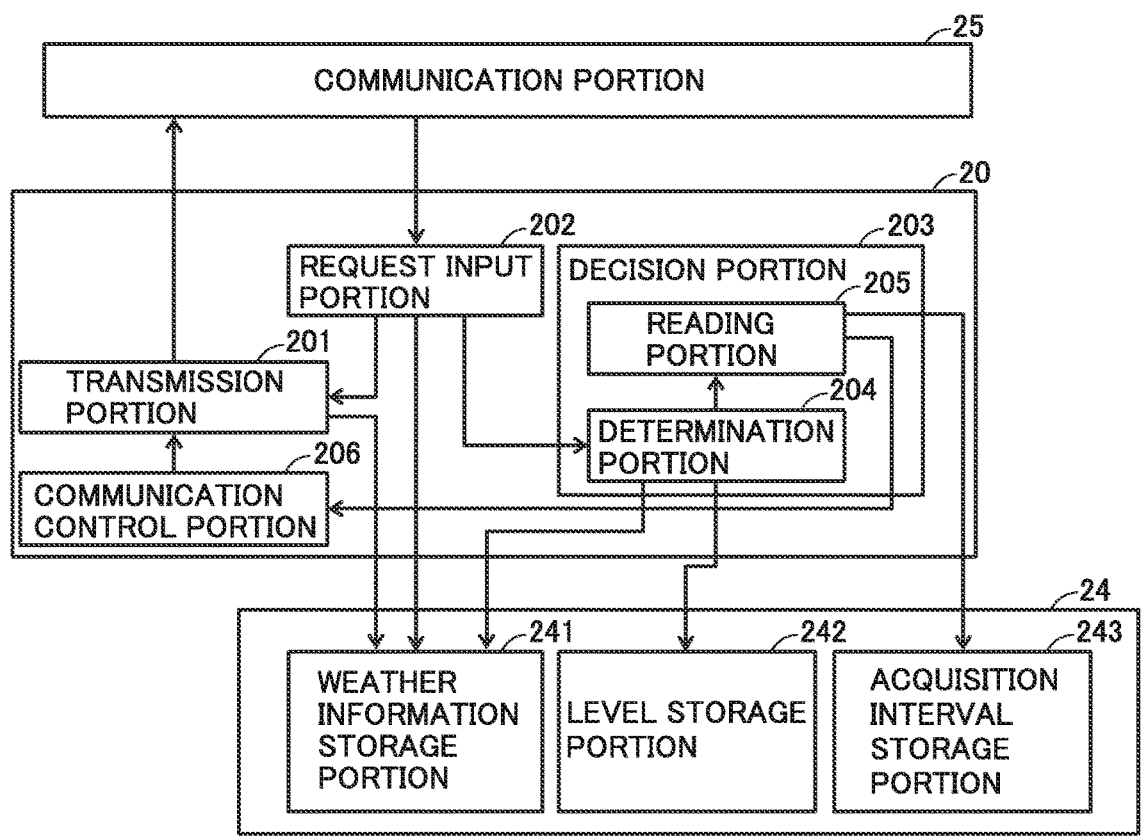
FIG. 9 is a block diagram illustrating an example of a function configuration of a server according to the second embodiment.

FIG. 9 is a block diagram illustrating an example of a function configuration of the server 200, by which the aforementioned operation is performed. Each of functions in FIG. 9 is realized mainly by the CPU 20 when the CPU 20 of the server 200 reads and executes a program, stored in the ROM 21, on the RAM 22. However, at least a part of the functions may be realized by another type of hardware illustrated in FIG. 3 or another type of hardware, such as an electric circuit, which is not illustrated.

Referring to FIG. 9, the CPU 20 of the server 200 includes a transmission portion 201 that transmits weather information to the control device 100, a request input portion 202 that receives a request of the weather information from the control device 100, a decision portion 203, and a communication control portion 206.

On the basis of weather information to be transmitted by the transmission portion 201, the decision portion 203 decides timing at which the control device 100 next acquires weather information. As an example, the decision portion 203 includes a determination portion 204 and a reading portion 205. The determination portion 204 and the reading portion 205 have the same functions as those of the determination portion 105 and the reading portion 106 which are included in the CPU 10 of the control device 100 according to the first embodiment, respectively.

The memory 13 includes a weather information storage portion 241 that stores weather information to be transmitted, a level storage portion 242 that stores the level for each type of weather information, which is indicated in FIG. 4(A), and an acquisition interval storage portion 243 that stores the interval (period) for each level until the next acquisition of weather information, which is indicated in FIG. 4(B).

The transmission portion 201 reads, from the weather information storage portion 241, weather information to be transmitted and transmits the weather information to the control device 100.

The determination portion 204 determines, by referring to the level storage portion 242, a level of the weather information to be transmitted to the control device 100. The reading portion 205 reads, from the acquisition interval storage portion 243, a time interval (period) corresponding to the level determined by the determination portion 204.

The communication control portion 206 controls the communication portion 25 to transmit, to the control device 100, information that is read from the acquisition interval storage portion 243 and indicates the time interval (period) until the control device 100 next acquires weather information from the server 200, during a time from first timing at which weather information is transmitted in response to a request from the control device 100 to second timing after the period has elapsed.

Figure 10:
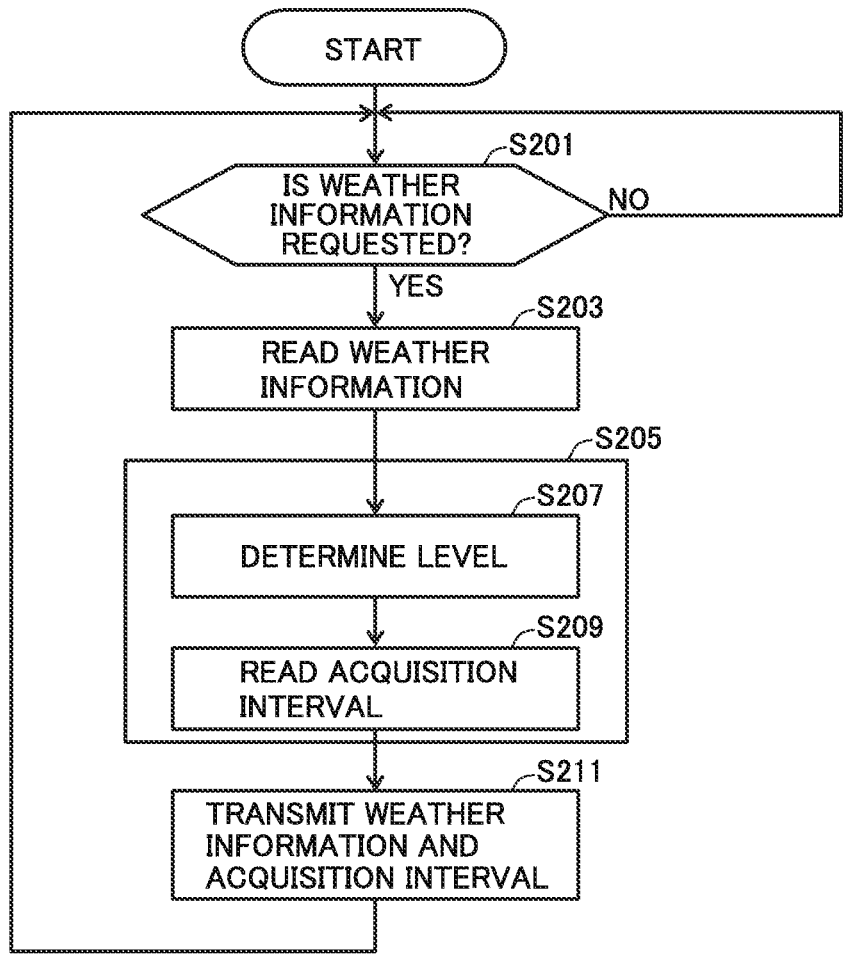
FIG. 10 is a flowchart illustrating a specific example of a flow of an operation of the server according to the second embodiment.

FIG. 10 is a flowchart illustrating a specific example of a flow of an operation of the server 200 according to the second embodiment. The operation illustrated in the flowchart of FIG. 10 is realized when the CPU 20 of the server 200 reads and executes a program, stored in the ROM 21, on the RAM 22 to exert each function in FIG. 9.

Referring to FIG. 10, when receiving a request of weather information from the control device 100 (YES at step S201), the CPU 20 of the server 200 reads, from the memory 24, weather to be transmitted (step S203). On the basis of the weather information to be transmitted, the CPU 20 decides a time interval (period) until the control device 100 next acquires weather information after the weather information (step S205). Specifically, the CPU 20 determines a level of the acquired weather information by referring to the relation of FIG. 4(A) (step S207), and reads, from the relation of FIG. 4(B), an interval (period), corresponding to the level, until the next acquisition of weather information (step S209).

The CPU 20 transmits the requested weather information to the control device 100, and transmits, to the control device 100, information indicating the period decided at step S205 above together with the weather information or after the weather information and before the next weather information is transmitted (step S211).

Third Embodiment

In the systems according to the first embodiment and the second embodiment, a so-called pull-type method of transmitting information in which, when the control device 100 requests weather information from the server 200, the weather information is transmitted from the server 200 to the control device 100, is adopted. The method of transmitting weather information is not limited to the pull-type one, and may be a push-type one. That is, a method in which timing of transmission is decided on the side of the server 200 and the server 200 spontaneously transmits weather information to the control device 100 at a time point when the timing is reached. In a system according to a third embodiment, the server 200 decides timing of transmitting weather information and transmits the weather information to the control device 100 at the timing.

Since a configuration of the system and device configurations of the control device 100 and the server 200 according to the second embodiment are similar to the configuration of the system and the device configurations of the control device 100 and the server 200 according to the first embodiment, description thereof is not iterated.

Figure 11:
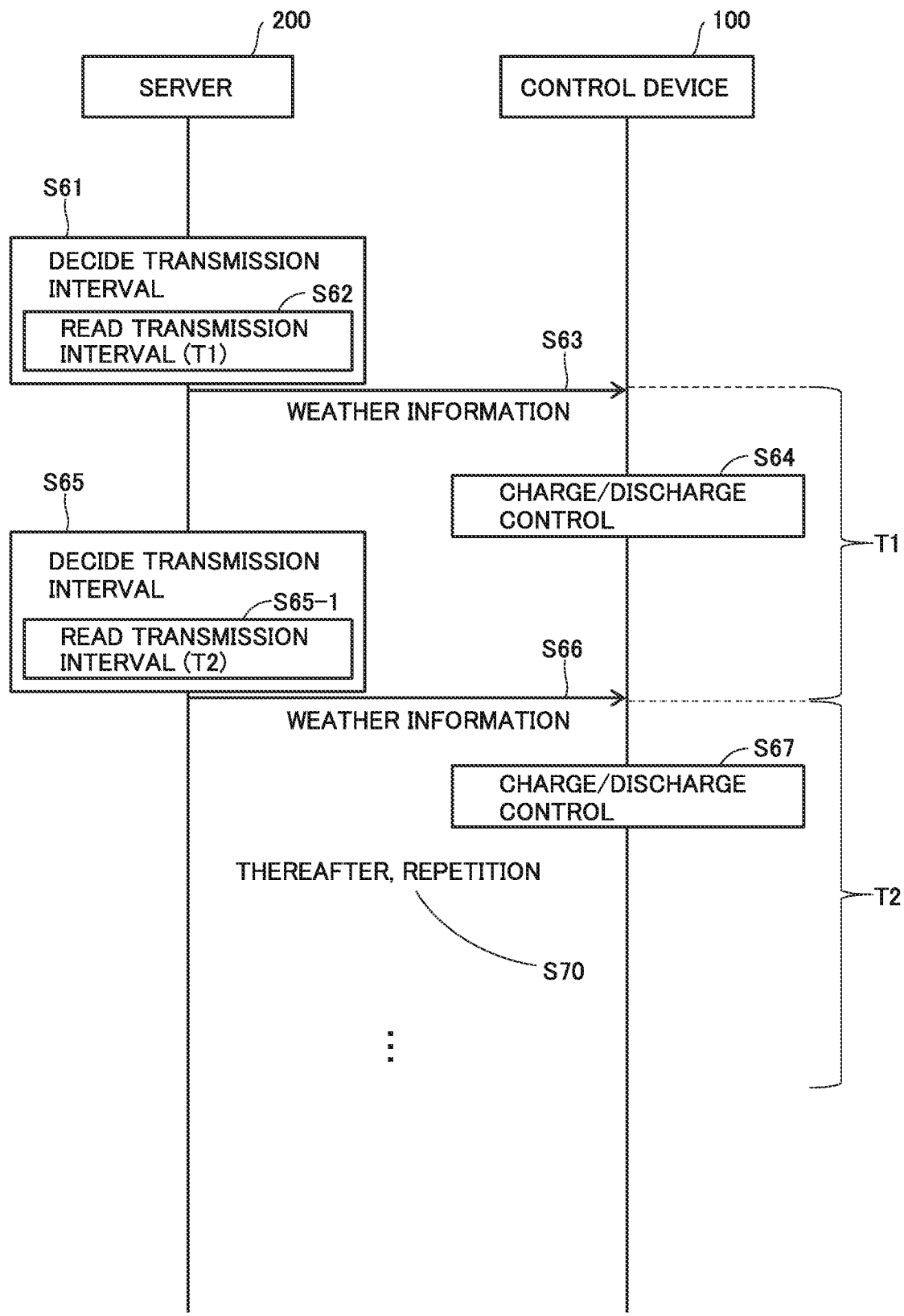
FIG. 11 is a view illustrating an operation of a control system according to a third embodiment.

FIG. 11 is a view illustrating an operation of the control system according to the third embodiment. Referring to FIG. 11, on the basis of weather information to be transmitted, the server 200 decides an interval until the server 200 next transmits weather information after the weather information (step S61). Specifically, the server 200 determines, by referring to the relation of FIG. 4(A), a level of the weather information to be transmitted, and reads a time interval (period) T1 corresponding to the determined level from the relation of FIG. 4(B) (step S62).

After deciding the period T1, the server 200 transmits the weather information to the control device 100 (step S63), and starts timing. The server 200 monitors elapse of the decided period T1 after the transmission of the weather information. The control device 100 which has received the weather information executes charge/discharge control on the basis of the weather information (step S64).

When the decided period T1 has elapsed after the transmission of the weather information, on the basis of the weather information to be transmitted next, the server 200 decides an interval until weather information is further next transmitted (step S65). Similarly to step S62 above, the server 200 determines, by referring to the relation of FIG. 4(A), a level of the weather information to be transmitted further next, and reads a time interval (period) T2 corresponding to the determined level from the relation of FIG. 4(B) (step S65-1).

After deciding the period T2, the server 200 transmits the weather information to the control device 100 (step S66). The control device 100 which has received the weather information executes charge/discharge control on the basis of the weather information (step S67).

Thereafter, a similar operation is repeated in the system (step S70). That on the basis of weather information to be transmitted, the server 200 decides timing at which weather information is next transmitted, and, after transmitting the weather information, transmits the next weather information at the aforementioned timing.

Figure 12:
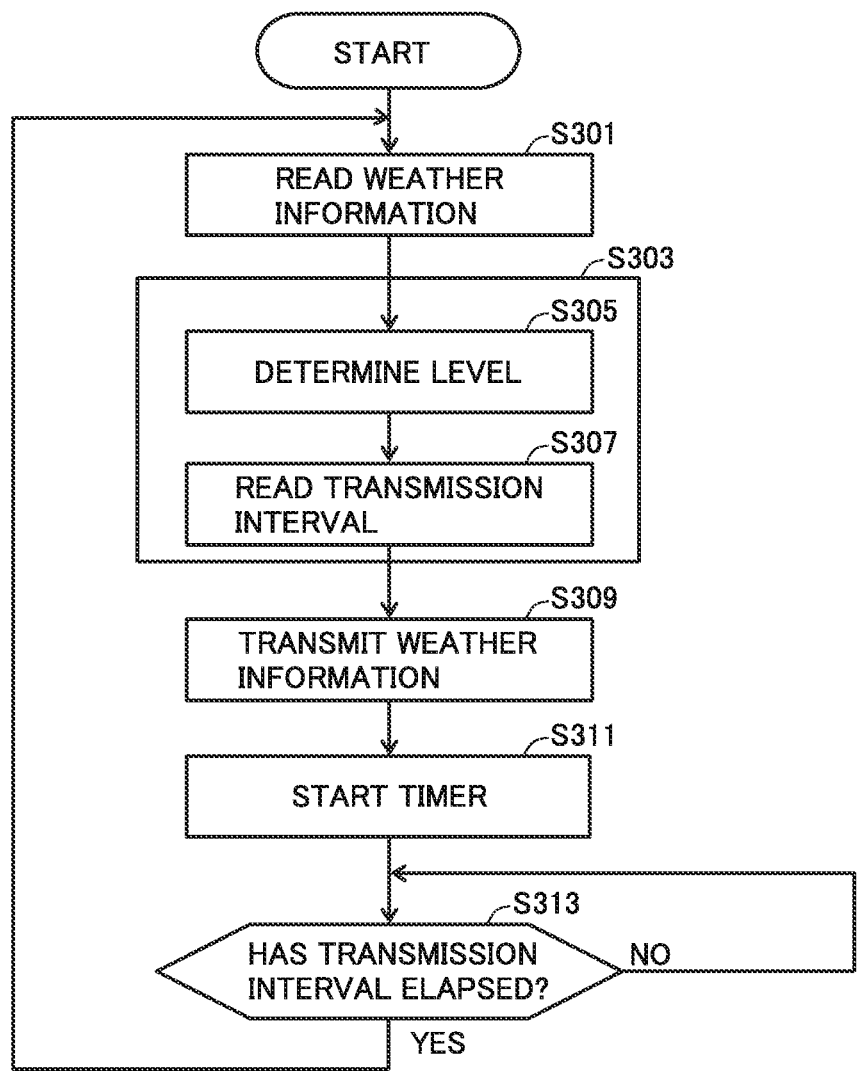
FIG. 12 is a flowchart illustrating a specific example of a flow of an operation of a server according to the third embodiment.

FIG. 12 is a flowchart illustrating a specific example of a flow of an operation of the server 200 according to the third embodiment. The operation illustrated in the flowchart of FIG. 12 is also realized when the CPU 20 of the server 200 reads and executes a program, stored in the ROM 21, on the RAM 22 to exert each function mainly in FIG. 9. The operation of FIG. 12 is started at a time point when timing at which weather information is transmitted from the server 200 to the control device 100 is reached.

Referring to FIG. 12, when the timing of transmitting weather information is reached, the CPU 20 of the server 200 reads, from the memory 24, the weather information targeted for transmission (step S301). On the basis of the weather information targeted for transmission, the CPU 20 decides a time interval (period) until the control device 100 next acquires weather information after the weather information (step S303). Specifically, the CPU 20 determines, by referring to the relation of FIG. 4(A), a level of the acquired weather information (step S305), and reads an interval (period), corresponding to the level, until the next acquisition of weather information from the relation of FIG. 4(B) (step S307).

The CPU 20 transmits the target weather information to the control device 100 (step S309), and starts timing by starting a timer not illustrated (step S311).

The CPU 20 refers to the timer which has started timing at step S311 above to monitor elapse of the period decided at step S303 above. Then, when the period has elapsed (YES at step S313), the CPU 20 repeats the operation from the beginning. That is, when the period has elapsed, the CPU 20 reads, from the memory 24, weather information to be transmitted to the server 200 next (step S301), and decides timing of transmitting weather information further next (step S303) and transmits the target weather information to the control device (step S309).

Effect of First to Third Embodiments

Each of the operations above is performed in each of the systems, and thus, on the basis of weather information to be transmitted from the server 200 to the control device 100, timing at which weather information after the weather information is next transmitted from the server 200 to the control device 100 is decided. By setting a level to be higher as weather information indicates a higher possibility of a power failure, setting a level to be lower as weather information indicates a lower possibility of a power failure, and setting an interval until the next transmission of weather information to be shorter as a level of weather information is higher, transmission management according to a possibility of a power failure is enabled. That is, as a possibility of a power failure is higher, the server 200 transmits weather information to the control device 100 at short intervals. As a result, the control device 100 becomes able to execute careful charge/discharge control correspondingly to weather information. On the other hand, as a possibility of a power failure is lower, an interval of weather information transmitted from the server 200 to the control device 100 becomes longer. As a result, in a condition where there is a low possibility of a power failure, it is possible to suppress a load of communication between the server 200 and the control device 100. Thus, in each of the control systems, it is possible to achieve both reduction in a communication load and appropriate charge/discharge control.

Note that, as described in the first embodiment to the third embodiment, a transmission interval of weather information may be managed on the side of the control device 100 or may be managed on the side of the server 200. Furthermore, the method of transmitting weather information also may be the so-called pull-type one in which transmission from the server 200 is performed in response to a request from the control device 100, or may be the so-called push-type one in which the server 200 spontaneously performs transmission to the control device 100.

Fourth Embodiment

In a fourth embodiment, description will be given for a configuration by which standardization of charge/discharge control is achieved regardless of a condition of communication with an outside, such as the server 200, which provides weather information.

Since a configuration of a system and device configurations of the control device 100 and the server 200 according to the fourth embodiment are similar to the configuration of the system and the device configurations of the control device 100 and the server 200 according to the first embodiment, description thereof is not iterated.

The control device 100 according to the fourth embodiment stores charge/discharge control to be executed for each type of weather information in the memory 13 in advance. FIG. 13 is a view indicating an example of a relation of the charge/discharge control to be executed for each type of weather information. Referring to FIG. 13, for example, the control device 100 stores that the control corresponding to weather information is performed when an emergency warning or a warning is announced as to a category of a heavy rain and a storm (gale) and the control corresponding to weather information is performed when an emergency warning is announced as to a category of high waves. When acquiring weather information from the server 200, the control device 100 decides charge/discharge control to be executed, by referring to the relation of FIG. 13 which is stored in the memory 13.

The control device 100 attempts to acquire weather information by making an inquiry to the server 200 at prescribed time intervals. In a case where the weather information is acquired and a corresponding warning or the like of a type of the weather information is called off after the control corresponding to weather information is started, the control device 100 is able to promptly finish the control corresponding to weather information and perform switching to the normal charge/discharge control, that is, the control to supply (discharge) power to the electric apparatus 400.

However, in a case where communication between the control device 100 and the server 200 becomes out of service due to occurrence of a communication trouble or the like, the control device 100 is not able to acquire weather information from the server 200. Therefore, even when a warning or the like is canceled, the control device 100 is not able to obtain the information, and continues the control corresponding to weather information.

Then, in the control system according to the fourth embodiment, in a case of being unable to obtain weather information from the server 200 during a prescribed period after starting the control corresponding to weather information on the basis of weather information from the server 200, the control device 100 finishes the control corresponding to weather information and performs switching to the normal charge/discharge control, that is, the control to supply (discharge) power to the electric apparatus 400.

Figure 14:
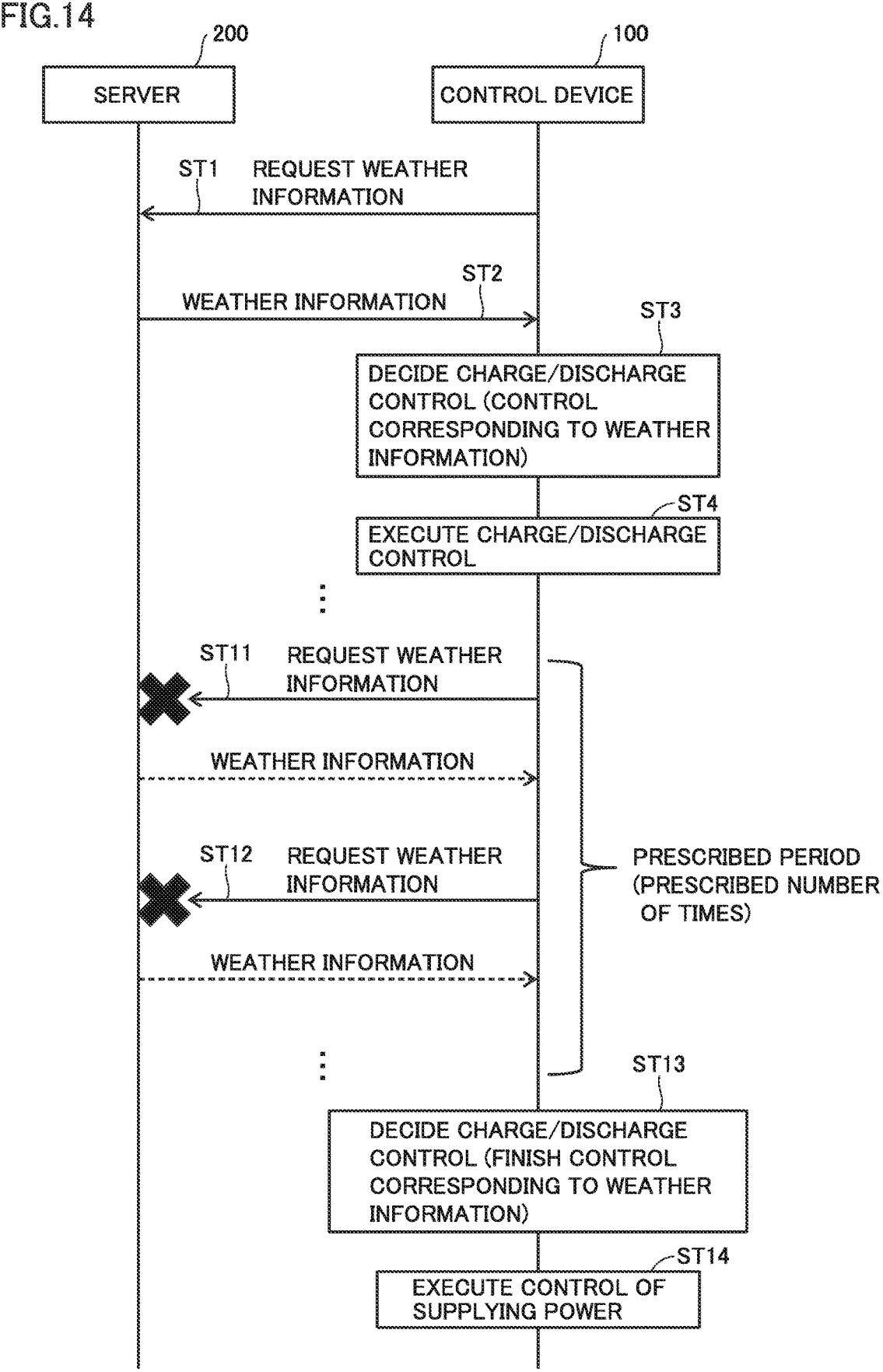
FIG. 14 is a view illustrating a flow of an operation of a control system according to a fourth embodiment.

FIG. 14 is a view illustrating a flow of an operation of the control system according to the fourth embodiment at a normal time. Referring to FIG. 14, the control device 100 requests weather information from the server 200 at prescribed time intervals (step ST1), and acquires weather information from the server 200 (step ST2). The control device 100 refers to the relation of FIG. 13, which is stored in the memory 13, and decides, on the basis of a type of the weather information acquired from the server 200, charge/discharge control to be executed (step ST3). In a case where the type of the acquired weather information is a type associated with the control corresponding to weather information in the relation of FIG. 13, when the normal control, that is, the control to supply (discharge) power from the power storage device 300 to the electric apparatus 400 is performed, the control device 100 decides to perform the control corresponding to weather information (step ST3). Then, the control device 100 executes charge/discharge control decided at step ST3 (step ST4). Thereby, in a case where a prescribed warning or the like is announced at a time of the normal control, the control corresponding to weather information is performed in the control system, and the power storage amount of the power storage device 300 therefore increases. Accordingly, it is possible to increase a possibility that a sufficient power storage amount is secured in the power storage device 300 even when a power failure is caused.

After starting the control corresponding to weather information on the basis of the weather information, the control device 100 requests weather information from the server 200 at prescribed time intervals (steps ST11 and ST12). It is preferable that the control device 100 requests weather information from the server 200 at prescribed time intervals regardless of charge/discharge control. Each of the prescribed time intervals is, for example, 15 minutes.

The control device 100 monitors a condition of communication at a time of making the request to the server 200. Then, in a case of failing to acquire weather information from the server 200 the prescribed number of times in series, that is, during a prescribed period, the control device 100 decides charge/discharge control to be executed (step ST13). The prescribed number of times is, for example, 192 times, that is, the prescribed period is, for example, 48 hours. This is a period which is normally assumed to be a period from announcement of an announced warning or the like to cancellation of the announced warning or the like.

In a case of executing the control corresponding to weather information, at step ST13, the control device 100 finishes the control corresponding to weather information and decides to perform switching to the normal charge/discharge control, that is, the control to supply (discharge) power to the electric apparatus 400. Thereafter, the control device 100 executes the charge/discharge control decided at step ST13 (step ST14). Thereby, even when the control device 100 fails to acquire weather information indicating cancellation of a warning or the like as communication between the control device 100 and the server 200 is unsuccessful, in a case where the communication between the control device 100 and the server 200 is unsuccessful for a prescribed period, the control corresponding to weather information is automatically canceled in the control system. Thus, in a case where a possibility of occurrence of a power failure disappears, even when the control device 100 fails to acquire information indicating that, it is avoided that a state where an excessive power storage amount is secured in the power storage device 300 continues for a long time.

<Function Configuration>

Figure 15:
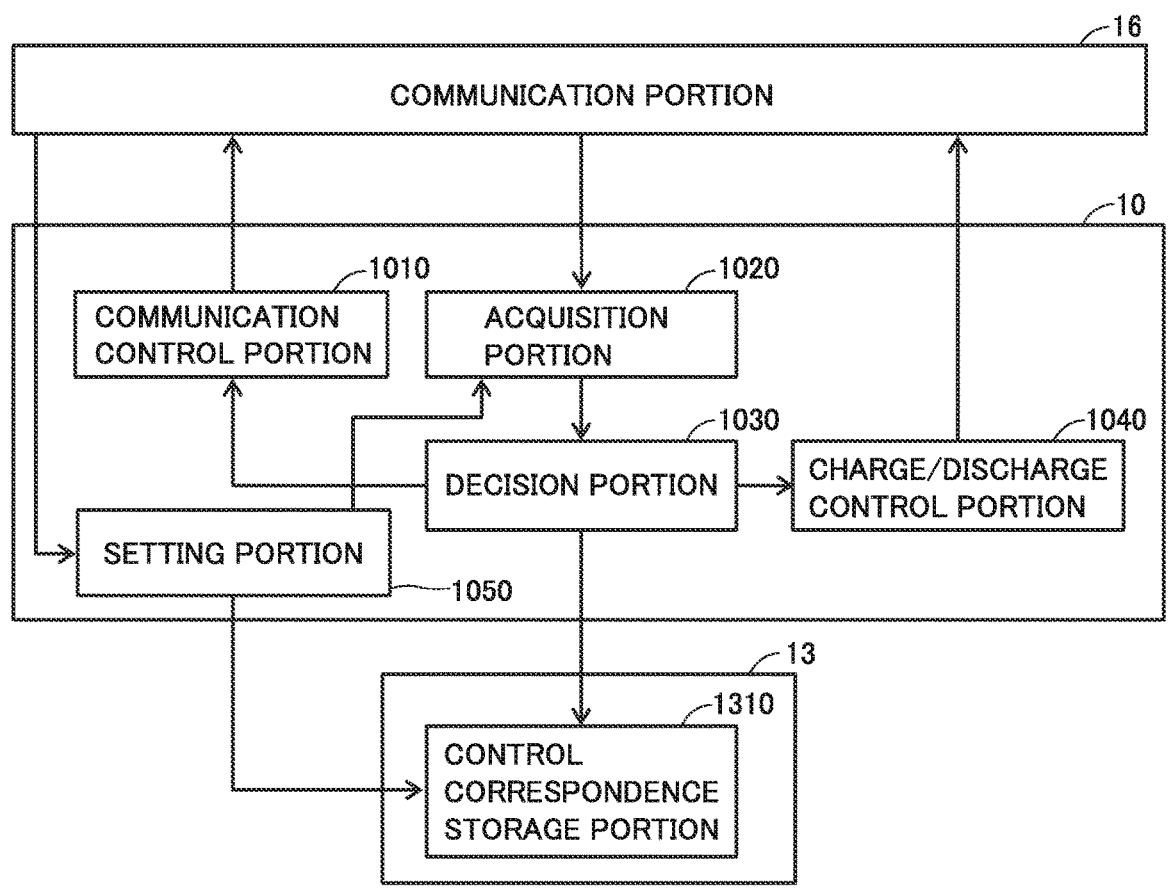
FIG. 15 is a block diagram illustrating an example of a function configuration of a control device according to the fourth embodiment.

FIG. 15 is a block diagram illustrating an example of a function configuration of the control device 100 according to the fourth embodiment. Each of functions in FIG. 15 is realized mainly by the CPU 10 when the CPU 10 of the control device 100 reads and executes a program, stored in the ROM 11, on the RAM 12. However, at least a part of the functions may be realized by another type of hardware illustrated in FIG. 2 or another type of hardware, such as an electric circuit, which is not illustrated.

Referring FIG. 15, the CPU 10 of the control device 100 according to the fourth embodiment includes a communication control portion 1010 that controls communication with the server 200, an acquisition portion 1020 that acquires weather information, a decision portion 1030 that decides charge/discharge control to be executed, and a charge/discharge control portion 1040 that executes the charge/discharge control.

The acquisition portion 1020 acquires weather information from the server 200 by performing communication with the server 200.

The memory 13 includes a control correspondence storage portion 1310 that stores control which is illustrated in FIG. 13 and executed by the charge/discharge control portion 1040 for each type of weather information.

The decision portion 1030 refers to the relation of FIG. 13 and decides whether control to be executed by the charge/discharge control portion 1040 is the control corresponding to weather information or the control to supply (discharge) power to the electric apparatus 400, on the basis of the weather information acquired from the server 200 by the acquisition portion 1020. That is, in a case where a type of the weather information acquired from the server 200 is associated with the control corresponding to weather information in the relation of FIG. 13, the decision portion 1030 decides to execute the control corresponding to weather information by the charge/discharge control portion 1040.

The communication control portion 1010 controls the communication portion 16 to request weather information from the server 200 at prescribed timing such as, for example, 15 minutes at least after the control corresponding to weather information is started. It is preferable that the communication control portion 1010 controls the communication portion 16 to always request weather information from the server 200 at prescribed timing regardless of charge/discharge control by the charge/discharge control portion 1040.

The decision portion 1030 decides to execute, by the charge/discharge control portion 1040, the normal control, that is, the control to supply (discharge) power to the electric apparatus 400, in a case where communication with the server 200 is unsuccessful, for example, 192 times, i.e., 48 hours after the control corresponding to weather information is started by the charge/discharge control portion 1040.

It is preferable that the CPU 10 of the control device 100 further includes a setting portion 1050. The setting portion 1050 sets an area targeted for weather information and a type of weather information, which is to be associated with the control corresponding to weather information, in accordance with a control signal received from the server 200 by the communication portion 16.

In this case, when receiving a request of setting from the terminal device 500, the server 200 delivers, to the terminal device 500, screen information by which a setting screen of FIG. 16 is displayed. The terminal device 500 displays the setting screen of FIG. 16 on a display on the basis of the screen information, and receives an input by a user.

Specifically, referring to FIG. 16, the setting screen includes an item in which an input of an area where the electric apparatus 400 included in the control system is installed is received and an item in which selection of a type of weather information used in the control corresponding to weather information to be executed by the control device 100 is received.

The area in which the electric apparatus 400 is installed corresponds to an area targeted for weather information to be used for the control corresponding to weather information. The item in which the area is received may receive an input of information associated with the area, for example, such as a zip code or a telephone number as illustrated in FIG. 16. Alternatively, the item in which the area is received may receive selection of a corresponding area from prefectures or municipalities.

The item in which selection of a type of weather information to be used is received receives, as a type of weather information, selection of a type of weather, such as a storm or a heavy rain, which is targeted for weather information. The item may further receive, for each piece of information of weather, selection of a rank (level of caution), such as a warning, an emergency warning, or an advisory, which is indicated by weather information.

In accordance with a user instruction of completion of selection, the terminal device 500 transmits, to the server 200, information indicating what has instructed in the screen of FIG. 16. When receiving the information instructed in the screen of FIG. 16 from the terminal device 500, on the bass of the information from the terminal device 500, the server 200 outputs a control signal based on the instruction to the control device 100 associated with a user of the terminal device 500 so as to rewrite the relation of the charge/discharge control to be executed for each type of weather information, which is related to the present control system, that is, the control system including the power storage device 300 targeted for charge/discharge control and the electric apparatus 400 connected to the power storage device 300 and which is indicated in FIG. 13. Thereby, the relation of FIG. 13, which is stored in the memory of the control device 100, is updated on the basis of user setting performed by using the setting screen of FIG. 16.

As described above, when acquiring weather information from the server 200, the control device 100 refers to the relation of FIG. 13, which is stored in the memory 13, to decide charge/discharge control to be executed. Thus, performing various types of setting by using the setting screen of FIG. 16 by a user is equivalent to setting/changing a content of charge/discharge control to be executed by the control device 100 by the user. That is, the control system is able to realize flexible charge/discharge control on the basis of a content which is set by the user by considering an area or an environment in which the power storage device 300 targeted for the charge/discharge control and the electric apparatus 400 connected to the power storage device 300 are installed.

<Operation Flow>

Figure 17:
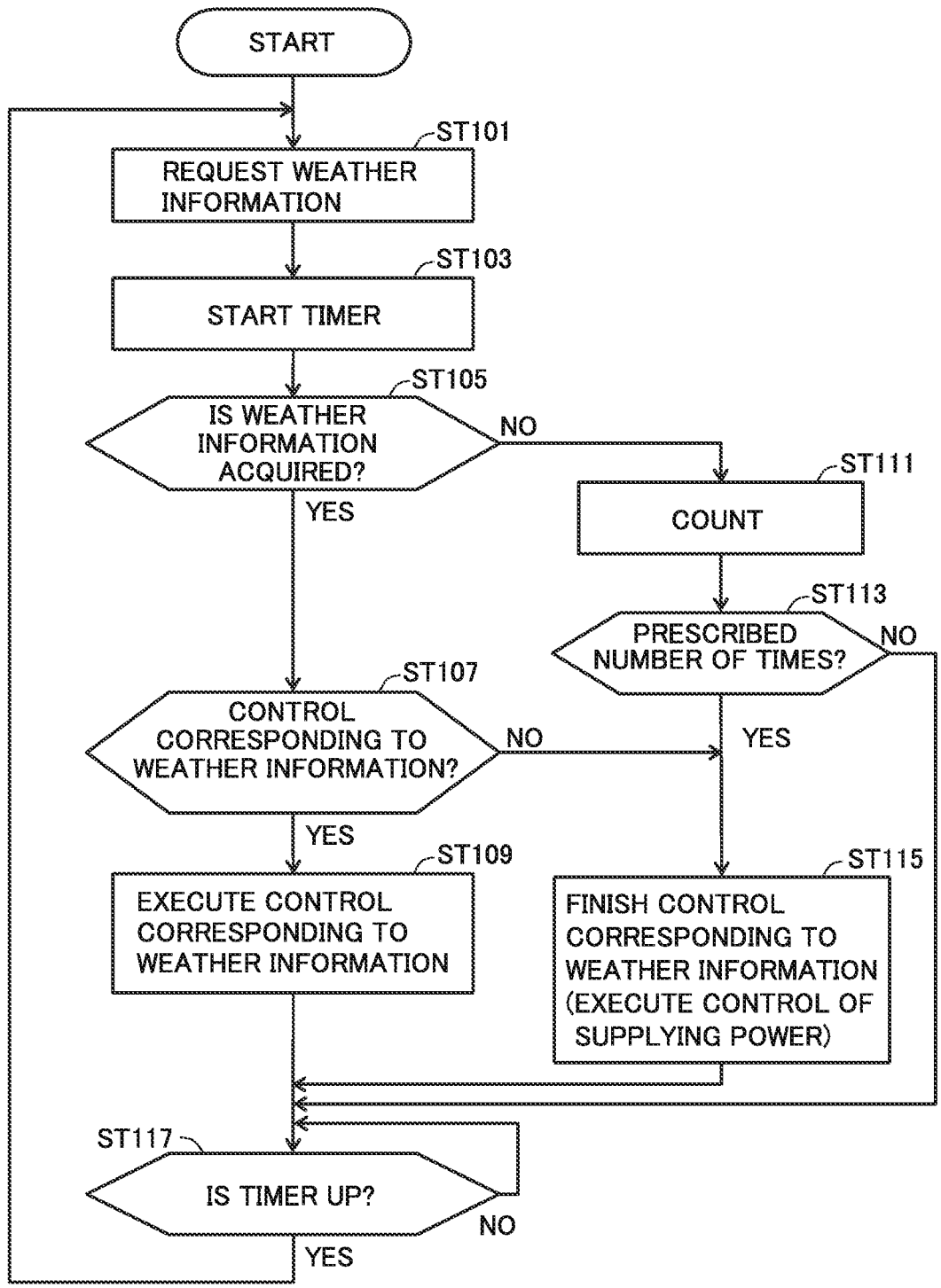
FIG. 17 is a flowchart illustrating a specific example of a flow of an operation of the control device according to the fourth embodiment.

FIG. 17 is a flowchart illustrating a specific example of a flow of an operation of the control device 100 according to the fourth embodiment. The operation illustrated in the flowchart in FIG. 17 is realized when the CPU 10 of the control device 100 reads and executes a program, stored in the ROM 11, on the RAM 12 to exert each function in FIG. 15. The operation in FIG. 17 is executed by the CPU 10 when the control device 100 is executing the normal charge/discharge control, that is, the control to supply (discharge) power from the power storage device 300 to the electric apparatus 400.

Referring to FIG. 17, the CPU 10 requests weather information from the server 200 after a prescribed time has elapsed from the preceding request of weather information to the server 200 (step ST101). Then, the CPU 10 starts a timer to decide timing of requesting weather information from the server 200 next (step ST103).

In a case of acquiring the weather information from the server 200 in response to the request at step ST101 above (YES at step ST105), the CPU 10 refers to correspondence (FIG. 13) between a type of weather information and charge/discharge control, which is stored in the memory 13, and thereby decides to execute charge/discharge control on the basis of the acquired weather information. Specifically, in a case where a type of the acquired weather information is one that is associated with the control corresponding to weather information (YES at step ST107), the CPU 10 decides to execute the control corresponding to weather information. The CPU 10 executes the decided control corresponding to weather information (step ST109).

Thereafter, the CPU 10 monitors that time of the timer started at step ST103 above is up. When the time of the timer is up, that is, when it is detected that timing at which weather information is next requested to the server 200 is reached, the CPU 10 returns the operation to step ST101 above, and requests weather information from the server 200. Then, the CPU 10 repeats the following operation.

In a case where the type of the acquired weather information is not associated with the control corresponding to weather information (NO at step ST107), the CPU 10 decides to execute the control to supply (discharge) power to the electric apparatus 400. Then, the CPU 10 executes the decided control of supplying (discharging) power (step ST115). In a case where the control corresponding to weather information has been performed, at step ST115, the CPU 10 finishes the control corresponding to weather information, and performs switching to the control to supply (discharge) power to the electric apparatus 400. In a case where the control of supplying (discharging) power is performed in the normal charge/discharge control, for example, in a case where the control of supplying (discharging) power is performed in a time period of daytime, at step ST115, the CPU 10 continues the control of supplying (discharging) power. Note that, in a case where charge control is performed in the normal charge/discharge control, for example, in a case where the charge control is performed in a time period of nighttime, at the step ST115, the CPU 10 may continue the charge control without finishing.

In a case of failing to acquire weather information from the server 200 in response to the request made at step ST101 above (NO at step ST105), the CPU 10 counts the number of failure in acquisition of weather information from the server 200 (step ST111). Then, the CPU 10 determines whether or not the number of times of failure in acquisition of weather information from the server 200 reaches the prescribed number of times, that is, whether or not a prescribed period has elapsed from the preceding acquisition of weather information. The CPU 10 repeats the operation after step ST101 above until the prescribed number of times is reached (NO at step ST113).

In a case where the number of times of failure in acquisition of weather information from the server 200 reaches the prescribed number of times, that is, the prescribed period has elapsed from the preceding acquisition of weather information (YES at step ST113), the CPU 10 decides to execute the control to supply (discharge) power to the electric apparatus 400. Then, the CPU 10 executes the decided control of supplying (discharging) power (step ST115).

Effect of Fourth Embodiment

In the control system, by performing the operation above by the CPU 10, the control corresponding to weather information is executed until the power storage amount of the power storage device 300 is filled, in a case where weather information of a prescribed type such as a warning is announced. As a result, even when a power failure is caused, it is possible to secure power used for operating the electric apparatus 400.

In a case where weather information indicating that the aforementioned weather information is called off is obtained from an outside in a state where the control corresponding to weather information is being performed, the control corresponding to weather information is finished and switched to the normal charge/discharge control in the control system. Thereby, power is appropriately supplied to the electric apparatus 400 without maintaining a state where power is excessively stored in the power storage device 300.

Furthermore, in the control system, also in a case where weather information is not able to be acquired from an outside due to interruption of communication between the control device 100 and the server 200 in the state where the control corresponding to weather information is being performed, at a time point when a period during which weather information is not able to be acquired continues for a prescribed period, the control corresponding to weather information is automatically canceled and switched to the normal control. Thereby, power is appropriately supplied to the electric apparatus 400 without maintaining the state where power is excessively stored in the power storage device 300.

Thus, in the control system, it is possible to achieve standardization of charge/discharge control regardless of a condition of communication between the control device 100 and the server 200 that provides weather information.

Fifth Embodiment

The disclosed feature is realized by one or more modules. For example, the feature may be realized by a circuit element or another hardware module, a software module in which processing for realizing the feature is prescribed, or a combination of a hardware module and a software module.

The above-described operation is also able to be provided as a program which is to be executed by the control device 100 or the server 200 and which is a combination of one or more software modules. Such a program is also able to be provided as a program product by being recorded in a computer-readable recording medium, such as a flexible disk, a CD-ROM (Compact Disk-Read Only Memory), a ROM, a RAM, or a memory card, which is attached to a computer. Alternatively, the program is also able to be provided by being recorded in a recording medium, such as a hard disk, which is embedded in a computer. In addition, the program is also able to be provided by download via a network.

Note that, the program according to the present disclosure may be one that executes processing by calling a necessary module among program modules, which are provided as a part of an operating system (OS) of a computer, in a predetermined array at predetermined timing. In this case, the program itself does not include the aforementioned module, and cooperates with the OS to execute the processing. Such a program which does not include the module may also be included in the program according to the present disclosure.

Moreover, the program according to the present disclosure may be provided by being incorporated in a part of a different program. Also in this case, the program itself does not include a module included in the aforementioned different program, and cooperates with the different program to execute the processing. Such a program which is incorporated in a different program may also be included in the program according to the present disclosure.

The provided program product is installed in a program storage portion such as a hard disk to be executed. Note that, the program product includes the program itself and the recording medium in which the program is recorded.

It should be considered that the embodiments disclosed here are merely exemplifications in all points and are not limited thereto. The scope of the invention is described not by the aforementioned description but by the scope of claims, and it is intended that meanings equivalent to the scope of claims and all modifications within the scope are included.

REFERENCE SIGNS LIST 10, 20 CPU
11, 21 ROM
12, 22 RAM
13, 24 memory
15 operation portion
16, 25 communication portion
100 control device
101, 206, 1010 communication control portion
102, 1020 acquisition portion
103, 1040 charge/discharge control portion
104, 203, 1030 decision portion
105, 204 determination portion
106, 205 reading portion
107, 1050 setting portion
108 request portion
131, 242 level storage portion
132, 243 acquisition interval storage portion
200, 200A, 200B server
201 transmission portion
202 request input portion
241 weather information storage portion
300 power storage device
400 electric apparatus
400A air conditioner
400B water heater
500 terminal device
1310 control correspondence storage portion

The invention claimed is:

1. A control system, comprising:
a control device that is connected to a power storage device capable of supplying power to one or more electric apparatuses;
a server that is capable of communication with the control device;
wherein the server is configured to transmit weather information to the control device,
wherein the control device comprises a processor configured to:
control, on a basis of the weather information transmitted from the server, charge to the power storage device and power supply from the power storage device to the electric apparatuses; and
decide, on a basis of the weather information to be transmitted by the server, a period from timing at which the weather information is transmitted to timing at which the server next transmits weather information to the control device,
wherein at second timing at which the period has elapsed from first timing at which the server has transmitted the weather information to the control device, the server is further configured to transmit weather information to the control device,
wherein the processor of the control device is further configured to:
set, for each weather information, an interval from timing at which the weather information is transmitted to timing at which the server next transmits weather information to the control device in accordance with a user operation; and
decide the interval according to the weather information by referring to the setting.

2. The control system according to claim 1, wherein the processor of the control device is configured to request weather information from the server,
the server is configured to transmit the weather information to the control device in response to the request from the control device, and
the processor of the control device is configured to request weather information from the server at the second timing.

3. A control device that is connected to a power storage device capable of supplying power to one or more electric apparatuses, comprising a processor configured to:

acquire weather information from a server;
control, on a basis of the weather information acquired from the server, charge to the power storage device and power supply from the power storage device to the electric apparatuses;
decide, on a basis of the weather information acquired from the server, a period from timing at which the weather information is acquired to timing at which weather information is next acquired;
in a case where the weather information is acquired from the server, further acquire, after the period has elapsed from timing at which the weather information has been acquired, weather information from the server;
set, for each weather information, an interval from timing at which the weather information is acquired to timing at which weather information is next acquired in accordance with a user operation; and
decide the interval according to the weather information by referring to the setting.

4. A control method of a power storage device that is capable of supplying power to one or more electric apparatuses, comprising the steps of:

acquiring weather information from a server;

controlling, on a basis of the weather information acquired from the server, charge to the power storage device and power supply from the power storage device to the electric apparatuses;

deciding, on a basis of the weather information acquired from the server, a period from timing at which the weather information is acquired to timing at which weather information is next acquired;

further acquiring, at second timing at which the period has elapsed from first timing at which the weather information has been acquired, weather information;

setting, for each weather information, an interval from timing at which the weather information is acquired to timing at which weather information is next acquired in accordance with a user operation; and deciding the interval according to the weather information by referring to the setting.

* * * * *